United States Patent [19]

Mahon et al.

[11] Patent Number: 4,947,364
[45] Date of Patent: Aug. 7, 1990

[54] METHOD IN A COMPUTING SYSTEM FOR PERFORMING A MULTIPLICATION

[75] Inventors: Michael J. Mahon, San Jose; Allen Baum, Palo Alto, both of Calif.

[73] Assignee: Hewlett-Packard Company, Palo Alto, Calif.

[21] Appl. No.: 392,177

[22] Filed: Aug. 9, 1989

Related U.S. Application Data

[62] Division of Ser. No. 790,581, Oct. 23, 1985.

[51] Int. Cl.$^5$ ............................................. G06F 7/52
[52] U.S. Cl. ................................................ 364/757
[58] Field of Search ............... 364/754, 757, 758, 759, 364/755, 756

[56] References Cited

U.S. PATENT DOCUMENTS

| | | | |
|---|---|---|---|
| 4,027,147 | 5/1977 | Majos et al. | 364/759 |
| 4,543,641 | 9/1985 | Fukuta et al. | 364/756 |
| 4,677,583 | 6/1987 | Ohtsuki et al. | 364/756 |
| 4,745,569 | 5/1988 | Yamaoda et al. | 364/755 |
| 4,811,269 | 3/1989 | Hirose et al. | 364/754 |

Primary Examiner—Gary V. Harkcom
Assistant Examiner—Tan V. Mai
Attorney, Agent, or Firm—Roland I. Griffin; Alan H. Haggard

[57] ABSTRACT

In a computing system a method for performing a multiplication of a first multiplicand and a second multiplicand is presented. The computing system includes a plurality of registers, an instruction decoder, an arithmetic logic unit, and a preshifter. The first multiplicand is divided into a plurality of equal length sections. Each section includes "n" bits, where "n" is an integer greater than one. The second multiplicand is placed in a first register from the plurality of registers. A second register from the plurality of registers is cleared to zero. For each section from the plurality of sections, starting with a first section containing high order bits of the first multiplication and proceeding to a last section of the first multiplicand containing low order bits of the first multiplicand the following three substeps. First, when the low order bit of a current section is a "1", the contents of the first register are added to the contents of the second register via the arithmetic logic unit. Second, for every other bit in the current section that is a "1", a shift-and-add operation is performed by shifting, via the preshifter, the contents of the first register by an amount equal to the number of bit places the bit is to the left of the low order bit of the current section and by adding, via the arithmetic logic unit, the preshifted contents of the first register to the contents of the second register. Third, for every section from the plurality of sections that does not contain low order bits of the first multiplicand, the contents of the first register "n" bits are shifted to the left.

4 Claims, 4 Drawing Sheets

METHOD IN A COMPUTING SYSTEM FOR PERFORMING A MULTIPLICATION

CROSS REFERENCE TO RELATED APPLICATION

This is a division of application Ser. No. 06/790,581, filed Oct. 23, 1985.

BACKGROUND

Typically, in the prior art, arithmetic operations are performed in separate instruction cycles from shift operations. In a single instruction cycle either a shift is performed or an arithmetic operation is performed. Inability to shift and perform an arithmetic operation in a single instruction cycle prevents the implemention of single cycle instructions which perform unit indexing or shift and add multiply primitives.

In the prior art, rather than unit indexing, computer instruction sets have been optimized towards character manipulation by making the smallest unit of addressable storage be a character, or byte. However, the bulk of memory references are to units which are multiples of bytes (typically two, four or eight). This can produce difficulties when the contents of a register is used as an index into an array in which each member of the array comprises multiple bytes. Each index is treated as a byte number and therefore must be multiplied by the number of bytes which compose a member of the array.

Typically, in the prior art, multiply operations have been included in an instruction set. A computer architecture would implement the multiply using special hardware or using microcoded control and various data paths.

SUMMARY OF THE INVENTION

In accordance with the preferred embodiments of the present invention, a computing system is presented which has a preshifter coupled to one input of an arithmetic logic unit (ALU). Encoded data fields within certain computer instructions indicate whether preshifting is to be done and the amount of pre-shifting to be performed.

Instructions that perform indexed load or store operations include a bit which indicates whether the index register should be multiplied by the number of bytes contained by each unit of data accessed. This multiplication is performed by pre-shifting the contents of the index register before calculation of the address by the ALU.

Multiplication is accomplished using shift, add, subtract and shift-and-add instructions. When multiplication is called for, a subroutine chooses the smaller of multiplicands and divides the multiplicand into, for instance, three-bit segments. Each three-bit section can be multiplied with the larger multiplicand, by executing zero, one or more shift, add, subtract or shift-and-add instructions. A table may be accessed to determine which shift, add, subtract and/or shift-and-add instructions to use for each three-bit section.

DESCRIPTION OF THE PREFERRED EMBODIMENT

Figure 1:
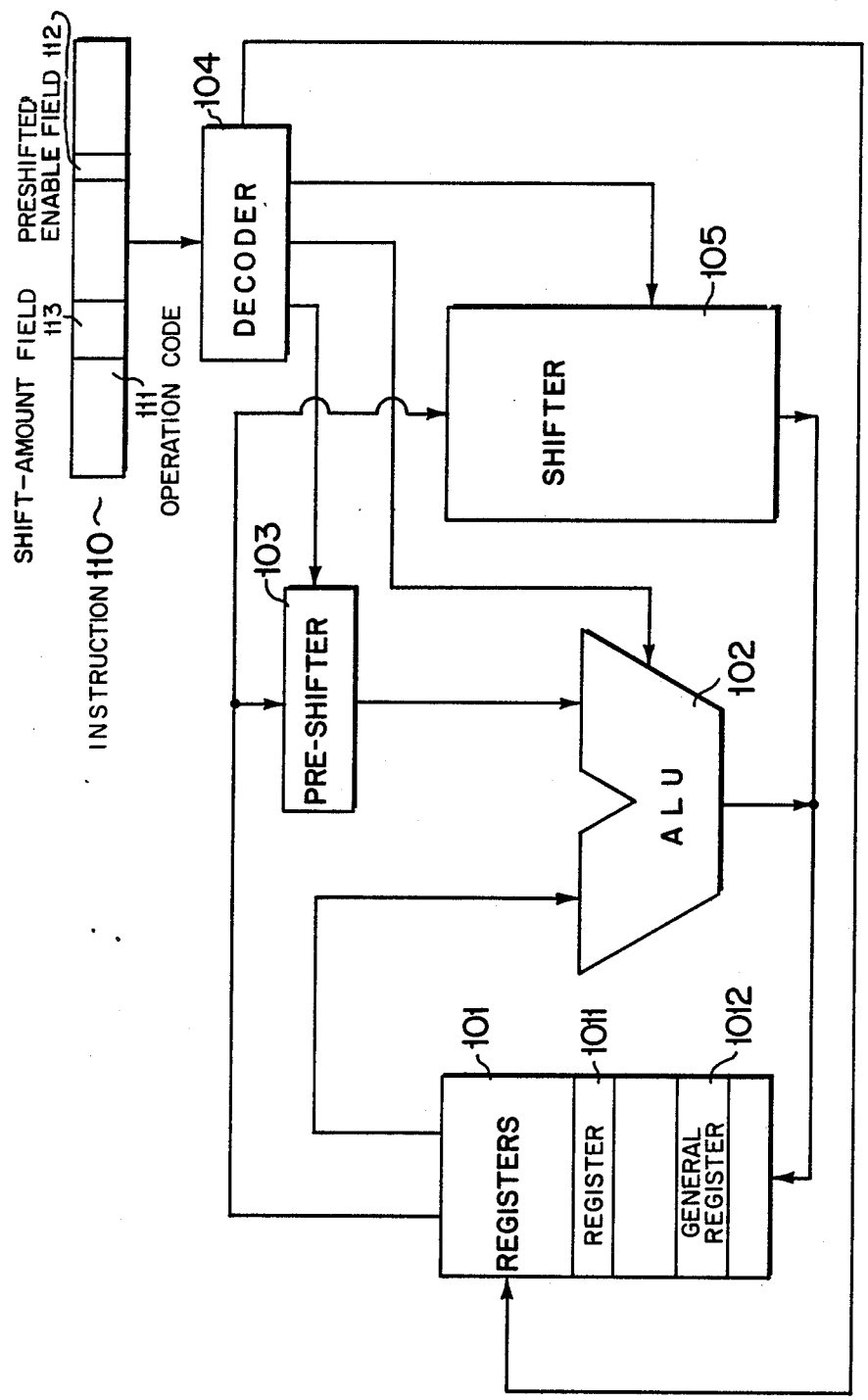
FIG. 1 is a partial block diagram of a computer system which allows variable preshifting of data before processing by an arithmetic logic unit (ALU) in accordance with a preferred embodiment of the present invention.
Figure 2:
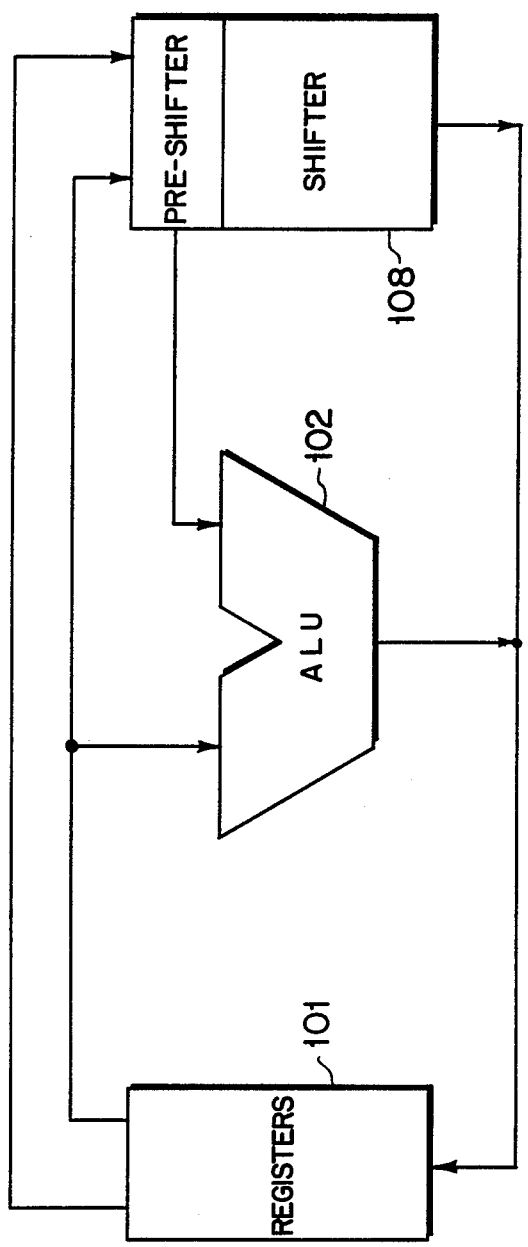
FIG. 2 is a partial block diagram of an alternate embodiment of a computer system in accordance with the present invention.

In FIG. 1, an instruction 110 includes an operation code field 111, a shift-amount field 113 and a preshifter enable field 112. Preshifter enable field 112 indicates to a decoder 104 whether to enable or disable a preshifter 103. Information encoded within operation code field 111 and shift amount field 113 indicates to decoder 104 the amount of shifting preshifter 103 is to perform if it is enabled. Preshifter 103 intercepts data in transit from a plurality of registers 101 to an ALU 102. Data from plurality of registers 101 may also be channelled through a shifter 105 (In FIG. 4 the classification of the three most significant bits is shown as a series of tests; however, an alternate embodiment may consist of a computed branch to one of eight code segments).

For instance, a general register 1011 in plurality of registers 101 may be used as an indexed address into an array. If instruction 110 contained an indexed load or store instruction, operation code field 111 would indicate that a load or store is to be performed. Preshifter enable field 112 would indicate shifting is to occur on data from general register 1011. Shift-amount field 113 would indicate the amount of shifting to be performed on data from general register 1011. If, for instance, instruction 110 is a load byte indexed, then shift-amount field 113 would contain a zero. If instruction 110 is a load 16-bit half-word indexed, then shift-amount field 113 would contain a one. If instruction 110 is a load 32-bit word indexed, then shift-amount field 113 would contain a two. If instruction 110 is a load 64-bit double-word indexed, then shift-amount field 113 would contain a three. As the shifting occurs after data have left register 1011, the data remaining in register 1011 are unchanged. The shifted data from general register 1011 are added to the contents of a general register 1012.

Figure 3:
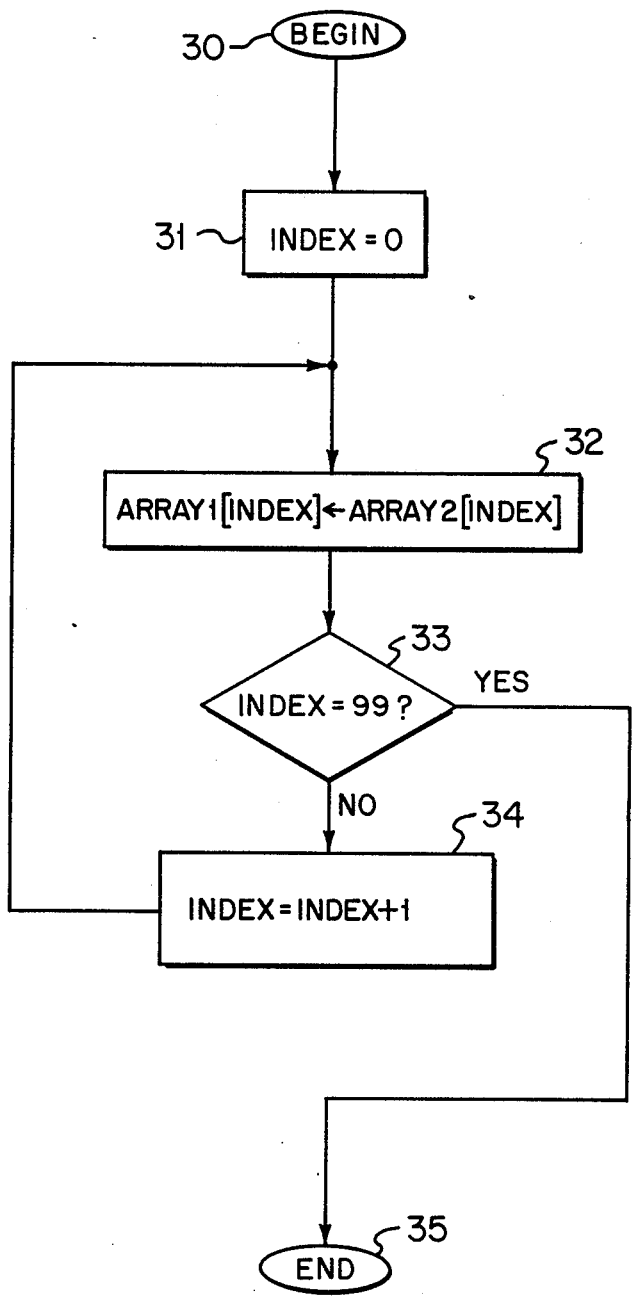
FIG. 3 is a flowchart of a program which might use unit indexing.

FIG. 3 is a flowchart of a program which might use unit indexing. The contents of the first 100 entries in ARRAY2 are loaded into ARRAY1. Under a computer system restricted to byte addressing, if ARRAY1 and ARRAY2 are composed of 32-bit words, it is necessary for the computer to multiply INDEX by 4 every time an access was made into a location in ARRAY1 or ARRAY2. Under the present invention, a unit indexing command with a shift of two would allow quick access into each location in ARRAY1 and ARRAY2.

Figure 4:
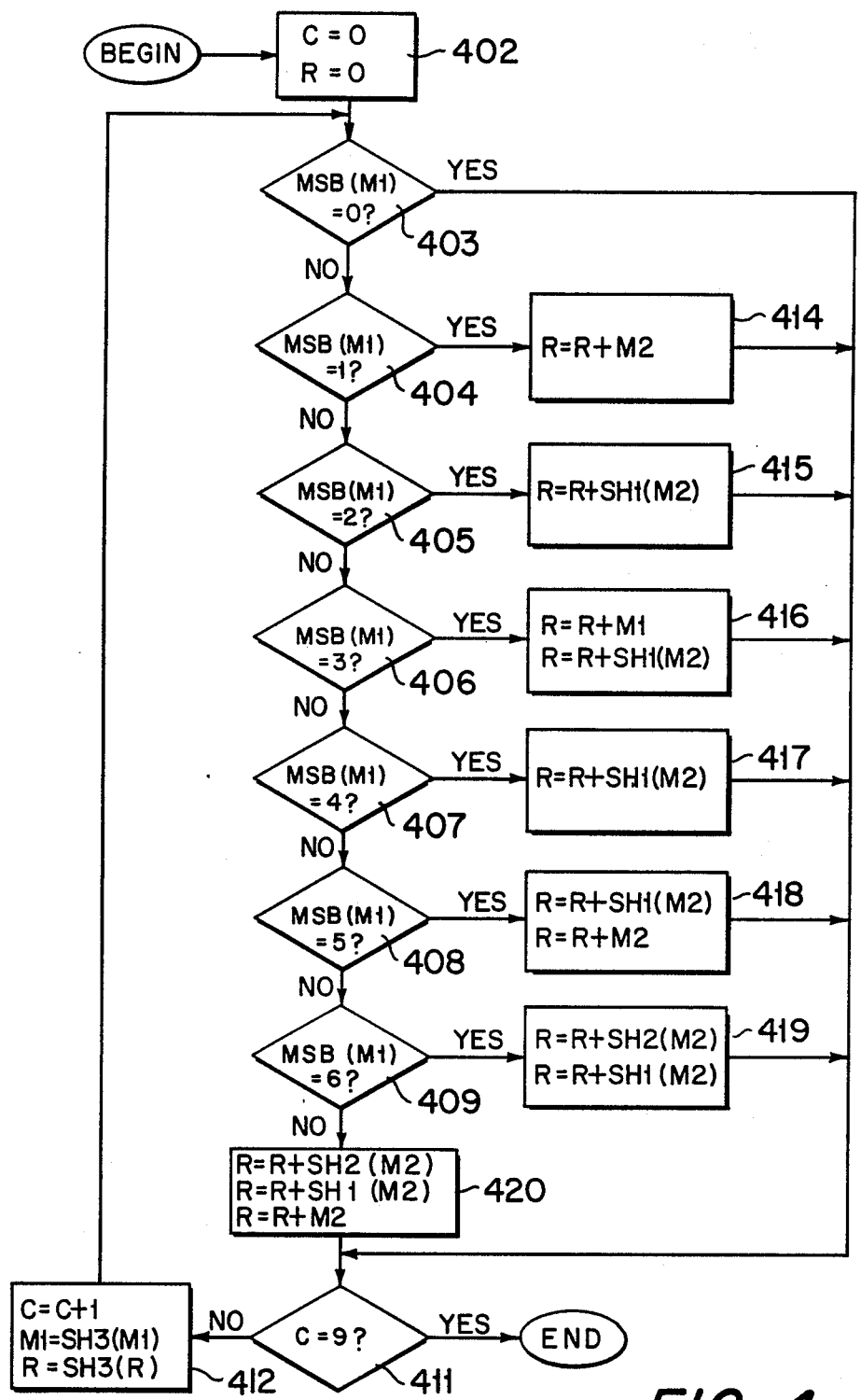
FIG. 4 is a flowchart of a program which used shift, add and shift-and-add instructions to perform multiplication.

Preshifter 103 might also be used in conjunction with ALU 102 to provide for shift-and-add instructions allowing for fast software implementation of multiplies. For instance, FIG. 4 is a flowchart of a program which uses shift, add, and shift-and-add instructions to perform a multiply of a 30-bit integer M1 with a 30-bit integer M2. At a step 402 the program initializes a counter C and a result R. Result R should be at least a 60-bit integer. In steps 403–409, the value of the three most significant bits of integer M1 are checked. The value will be an integer between 0 and 7. If the three most significant bits of integer M1 are not all 0, result R will be modified by one of steps 414–420.

For instance, if the value of the three most significant bits of M1 is 1, then the value of integer M2 is added to the current value of R and the result is stored in R. If the value of the three most significant bits of M1 is 2, then the value of integer M2 is shifted once and added to the current value of R and the result is stored in R. If the value of the three most significant bits of M1 is 3, then the value of integer M2 is shifted once and added to the current value of R, the value of integer M2 is added to the current value of R and the result is stored in R. If the value of the three most significant bits of M1 is 4, then the value of integer M2 is shifted twice and added to the current value of R and the result is stored in R. If the value of the three most significant bits of M1 is 5, then the value of integer M2 is shifted twice and added to the current value of R, the value of integer M2 is added to the current value of R and the result is stored in R. If the value of the three most significant bits of M1 is 6, then the value of integer M2 is shifted twice and added to the current value of R, the value of integer M2 is shifted once and added to the current value of R and the result is stored in R. If the value of the three most significant bits of M1 is 7, then the value of integer M2 is shifted twice and added to the current value of R, the value of integer M2 is shifted once and added to the current value of R, the value of integer M2 is added to the current value of R and the result is stored in R.

At a step 411 counter C is checked to see if the program has looped ten times. If so the program is finished. If not, in step 412, counter C is incremented, M1 is shifted 3 places to the left with the three most significant bits being dropped off, and the resultant is shifted three places to the left with the three most significant bits being saved. Then the program loops back as shown.

We claim:

1. In a computing system including a plurality of registers, an instruction decoder coupled to the plurality of registers, an arithmetic logic unit coupled to the plurality registers and to the instruction decoder, and a preshifter, coupled to the plurality of registers, to the instruction decoder and to the arithmetic logic unit, a method for performing a multiplication of a multiplier and a multiplicand, the multiplier being divided into a plurality of equal length sections, each section comprising "n" bits, where "n" is an integer greater than one, the method comprising the steps of:

(a) placing the multiplicand in a first register from the plurality of registers;
(b) clearing to zero a second register from the plurality of registers; and,
(c) for each section from the plurality of sections, starting with a first section containing high order bits of the multiplier and proceeding to a last section of the multiplier containing low order bits of the multiplier, performing the following substeps,
  (c1) if the low order bit of a current section is a "1", adding the contents of the first register to the contents of the second register via the arithmetic logic unit;
  (c2) for every bit in the current section that is a "1", other than the low order bit current section, performing a shift-and-add operation by shifting, via the preshifter, the contents of the first register by an amount equal to the number of bit places the bit is to the left of the low order bit of the current section and by adding, via the arithmetic logic unit, the preshifted contents of the first register to the contents of the second register; and,
  (c3) for every section from the plurality of sections that does not contain low order bits of the multiplier, shifting the contents of the second register "n" bits to the left.

2. A method as in claim 1 wherein "n" equals three.

3. In a computing system, a method for performing a multiplication of a multiplier and a multiplicand, the multiplier being divided into a plurality of equal length sections, each section comprising "n" bits, where "n" is an integer greater than one, the method comprising the steps of:

(a) placing the multiplicand in a first register;
(b) clearing to zero a second register; and,
(c) for each section from the plurality of sections performing the following substeps,
  (c1) if the low order bit of a current section is a "1", adding the contents of the first register to the contents of the second register;
  (c2) for every bit in the current section that is a "1", other than the low order bit current section, performing a shift-and-add operation by shifting the contents of the first register by an amount equal to the number of bit places the bit is to the left of the low order bit of the current section and by adding the preshifted contents of the first register to the contents of the second register; and,
  (c3) for every section from the plurality of sections that does not contain low order bits of the multiplier, shifting the contents of the second register "n" bits to the left.

4. A method as in claim 3 wherein "n" equals three.

* * * * *